United States Patent
Villalba, Jr.

[15] 3,671,008
[45] June 20, 1972

[54] FOOD MOLD

[72] Inventor: Fred A. Villalba, Jr., 9100 Rex Court, El Paso, Tex. 79925

[22] Filed: Aug. 28, 1970

[21] Appl. No.: 67,938

[52] U.S. Cl. ................................249/155, 17/32, 107/19 R
[51] Int. Cl. ....................A23g 1/22, A23g 3/12, A23g 3/18, F25c 7/20
[58] Field of Search................107/19 A, 15 R, 1 R, 16, 1 A, 107/18; 31/44; 17/32; 249/74, 92, 136, 155

[56] References Cited

UNITED STATES PATENTS

| | | | |
|---|---|---|---|
| 696,778 | 4/1902 | Weglein | 249/74 |
| 3,352,258 | 11/1967 | Lassaulx | 17/32 X |
| 1,757,447 | 5/1930 | Comstock | 107/19 A X |
| 2,837,761 | 6/1958 | Stiegler | 17/32 X |
| 2,929,099 | 3/1960 | Glenny | 249/74 X |
| 2,994,286 | 8/1961 | Musslavi | 17/32 X |

*Primary Examiner*—Jordan Franklin
*Assistant Examiner*—Geo. V. Larkin
*Attorney*—Clarence A. O'Brien and Harvey B. Jacobson

[57] ABSTRACT

A tortilla mold comprising a frame defining a central circular molding cavity which contains a vertically adjustable base disk for varying the thickness of the molded tortilla. The frame includes a series of sockets in the bottom of the mold cavity which receive downwardly projecting guides on the undersurface of the disk for guiding the vertical adjustment of the disk which is effected by several adjusting screws extending upwardly into the disk guides through the bottom of the frame. Gauge marks are associated with each screw so as to visionally indicate the adjustment of the disk. The wall of the molding cavity is circular and smooth, terminating in an upward cutting edge. The mold receives a thin overlayer of plastic within which the cornmeal is pressed, cut and formed.

2 Claims, 9 Drawing Figures

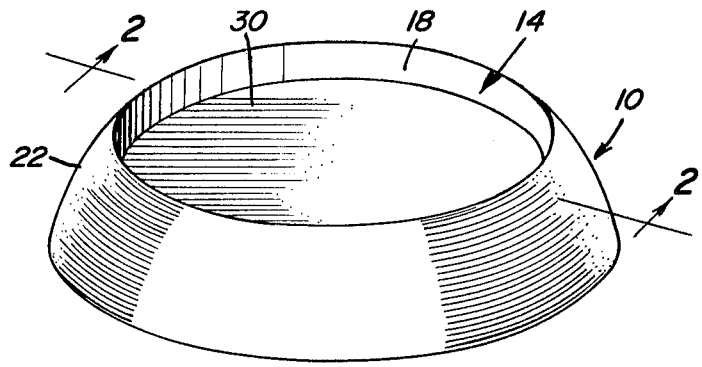
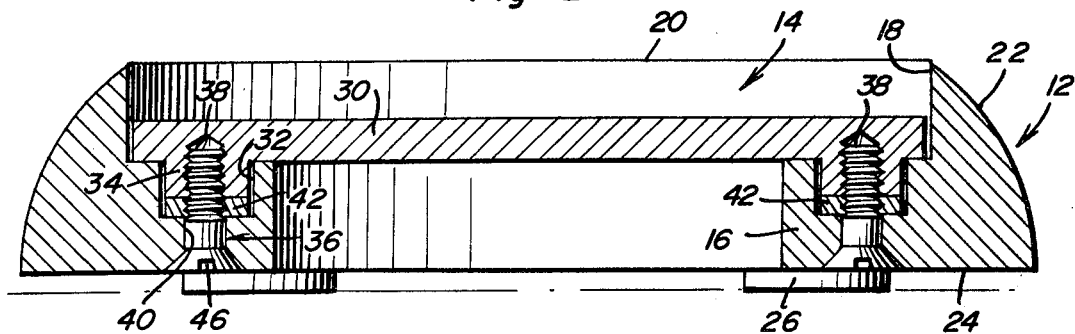
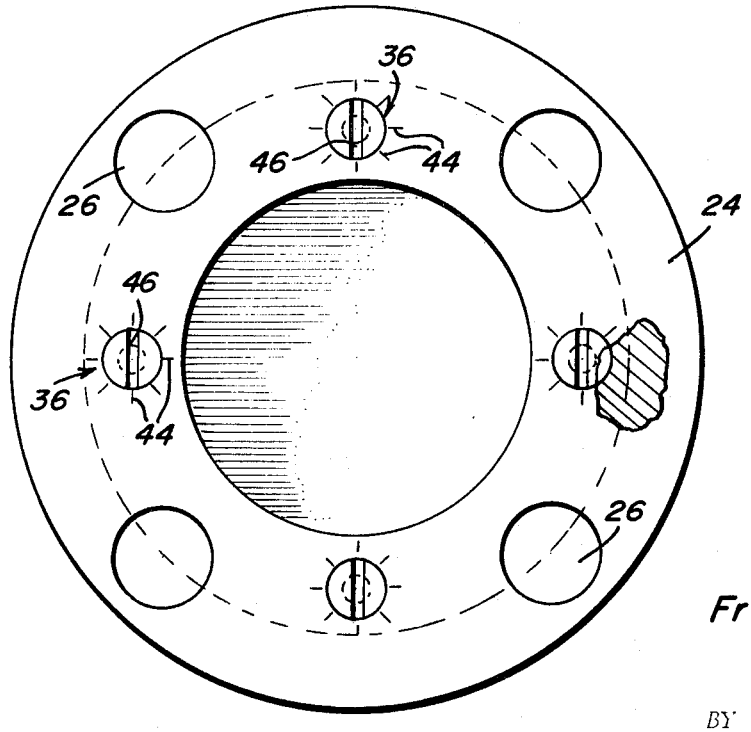

Fred A. Villalba, Jr.
INVENTOR.

BY Clarence A. O'Brien
and Harvey B. Jacobson
Attorneys

FOOD MOLD

The instant invention is generally concerned with the molding of foodstuffs, and more particularly relates to a uniquely constructed mold specifically adapted for forming tortillas, and the method of utilizing the mold.

The corn tortilla, as originated by the Mexican Indian, is made of a cornmeal dough and used daily as a bread substitute. It is made by patting a small amount of the dough between the hands until formed into a pancake shaped patty with an irregular thickness of one-eighth inch or greater and a diameter of approximately 5 to 6 inches. The tortilla is then cooked on a hot, ungreased griddle.

The thickness of the tortilla varies in accordance with the manner in which it is to be used. As an example, "tostadas," which are deep fried, crisp tortilla wedges, are prepared from a thin tortilla approximately ⅛ inch thickness. Likewise, tortillas for the preparation of tacos, enchiladas and the common corn tortilla will be approximately one-eighth inch thick. A thicker tortilla, approximately three-sixteenth inch or slightly thicker, and known as a ranch-style tortilla, is quite popular and used as a bread substitute. Another popular tortilla dish is the "gordita" which is prepared from tortillas approximately one-quarter inch thick. This tortilla is slit and filled with different cheese and meat fillings.

As will be appreciated, the tortilla is a food item which if properly and carefully prepared can have a variety of forms and/or uses. However, as will be readily recognized, the manual preparation requires great care and an expenditure of substantial time in properly forming and molding the tortillas for their various uses. Accordingly, it is a primary object of the instant invention to provide apparatus and an associated method whereby one can rapidly and almost automatically provide properly formed tortillas.

In conjunction with the above object, it is also highly significant to provide a tortilla mold which is adjustable in an exact manner so as to enable a utilization of the device in the formation of tortillas of any conventional thickness, the adjustment of the mold, within the extremes thereof, being infinite.

Other advantages reside in the fact that the apparatus is compact, lightweight, strong, easily cleaned, contains no loose parts, can be simply and easily adjusted, and produces a perfectly formed product ready for cooking.

The objects of the instant invention are achieved through the provision of a mold which incorporates a frame having a circular molding cavity therein with a thickness regulating disk forming the base of the cavity and being vertically adjusted by means of a plurality of upwardly directed adjusting screws having gauge lines associated therewith. The vertical movement of the disk is guided by appropriate guide means. The circular wall of the cavity is smooth and terminates in an upper knife edge surrounded by an annular convex frame wall. The frame itself is mounted on non-slip elastomeric feet, of a size and so oriented as to provide a firm base. The formation of the tortillas with the mold is effected utilizing a thin plastic liner or sheet, a portion of which is initially positioned in the mold. The cornmeal is then placed on top of the mold received portion of the plastic sheet and beneath an overlying folded portion thereof. Next, the enclosed cornmeal is rolled or otherwise pressed so as to conform to the shape of the cavity with the excess being severed by a pressing of the layers of the sheet on the cutting edge provided about the top of the cavity. The molded tortilla is then removed from the protective plastic and cooked as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the tortilla mold of the instant invention;

FIG. 2 is an enlarged cross-sectional view taken substantially on a plane passing along line 2—2 in FIG. 1;

FIG. 3 is a bottom plan view of the mold with a portion broken away for purposes of illustration;

Figure 4:
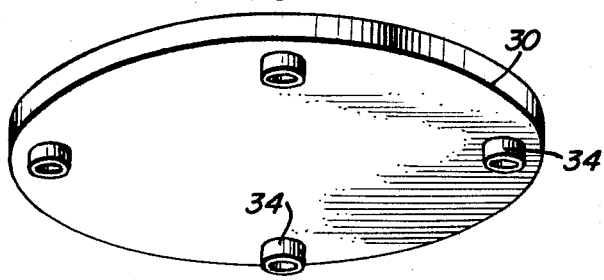
FIG. 4 is a perspective view of the thickness regulating disk.
Figure 5:
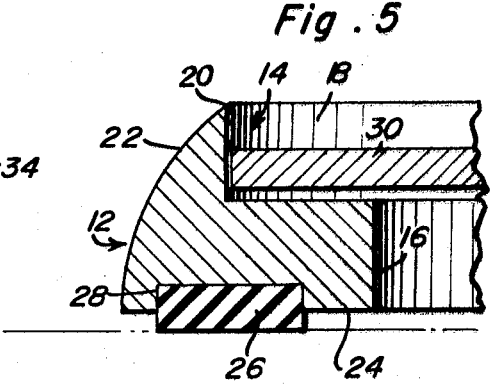
FIG. 5 is an enlarged cross-sectional detail taken through an edge portion of the mold and illustrating one of the non-slip disks.
Figure 6:
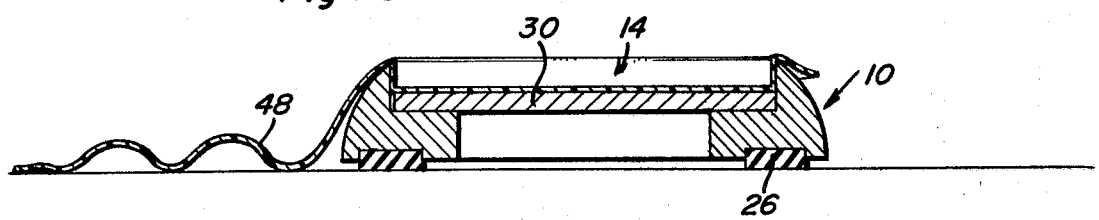
FIGS. 6, 7, 8 and 9 illustrate steps in the use of the mold and the formation of a tortilla.
Figure 7:
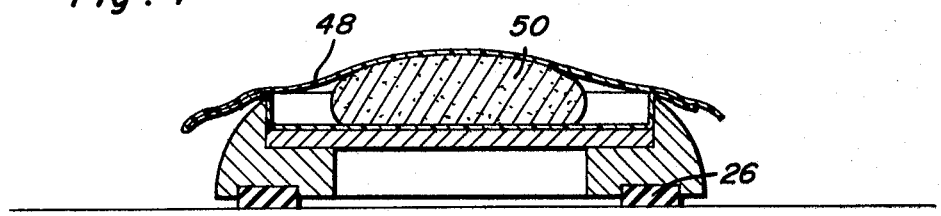

Referring now more specifically to the drawings, reference numeral 10 is used to generally designate the mold comprising the instant invention. This mold 10 includes a circular or annular frame 12 which has a central upwardly opening circular molding cavity 14 defined therein.

The lower end of the mold cavity 14 is defined by an inwardly projecting annular shoulder 16 which constitutes an integral portion of the frame 12. The circular wall 18 of the cavity 14 is smooth and vertical, providing no irregularities, undercut portions or the like such as would interfere with the provision of a smooth edged product. The upper edge 20 of the cavity wall 18 is in the nature of a cutting edge with the outer wall 22 of the frame 12 angling sharply downward and outward, along a convex path, from the cutting edge 20, providing a rounded annular outer surface to the frame 12 between the upper cutting edge 20 and the flat bottom surface of the frame.

The frame 12 is mounted on a series of enlarged non-slip elastomeric disks 26 provided at equally spaced points about the bottom 24 of the frame 12. It is preferred that at least four such disks 26 be provided so as to insure a substantial degree of stability to the mold 10, particularly during the pressing or rolling operation. The mounting of each of the disks 26 is effected by means of downwardly directed sockets 28 provided in the bottom of the frame 12. These sockets 28 receive the upper portions of the disks 26, which are adhesively or otherwise firmly secured therein, with approximately one-half of each disk 26 projecting below the bottom 24 of the frame for cushioned engagement with the table or other supporting surface.

The bottom molding surface, within the cavity 14, is provided by a flat circular disk 30 which overlies the annular shoulder 16 in close sliding relation to the circular cavity wall 18. This disk 30 is vertically adjustable so as to vary the thickness of the tortillas being molded.

In order to insure a proper adjustment of the thickness regulating disk 30, and a stabilization thereof in the adjusted position, appropriate guide means are utilized. Such guide means include a plurality of upwardly opening sockets 32 provided at equally spaced points about the shoulder 16, normally four such sockets 32 being provided. Each of these sockets in shoulder 16 receives a depending projection or guide 34 integral with the undersurface of the disk 30. Each guide 34 is closely although slidably received within the corresponding upwardly directed socket 32. The actual adjustment of the disk 30 is effected by a plurality of adjusting screws 36 extending upward through the shoulder 16 and into threaded engagement within downwardly directed internally threaded bores 38 formed in the guides or projections 34. Each of the screws 36 is freely rotatable within a passage 40 provided through the shoulder 16 and is locked against longitudinal movement by an appropriate nut 42 fixed thereto within the lower portion of the guide socket 32 whereby rotation of the screws 36 produces a corresponding vertical movement of the disk 30. It will be noted that the screws 36 are preferably flat headed screws received within the conical counterbores so as to be orientated flush with the bottom 24 of the frame 12.

Figure 8:
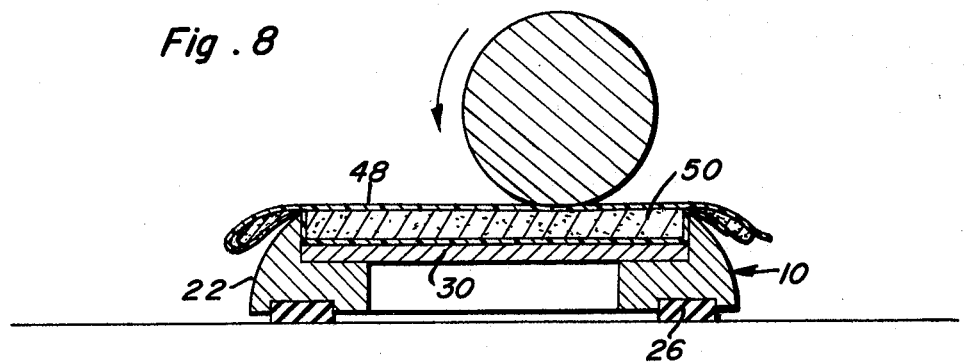
Figure 9:
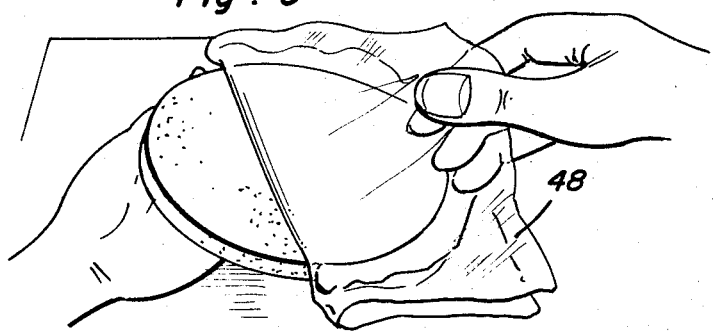

Noting the bottom plan view of FIG. 3, it will be seen that each of the screws is surrounded by gauge marks 44 with which a portion of the associated screws 36, for example the kerfs 46, can be selectively aligned. These gauge marks are calibrated so as to correspond with predetermined effective depths of the molding cavity 14 and will be appropriately marked so as to indicate the particular depth. In this manner, an exact adjusting of the disk 30 can be effected through merely sequentially rotating each of the adjusting screws 36 into alignment with the gauge mark 44 which corresponds to the thickness of tortilla desired. The provision of the guide 34 and guide receiving sockets 32 avoids any tendency for a binding of the thickness regulating disk 30 during the adjustment thereof. In addition, the smooth inner wall of the cavity 14 provides for a perfectly round product, from which the excess material has been properly severed by the upper cutting edge sharply formed by the downward and outward arcing outer wall 22 of the frame 12. This convex extension of the outer wall 22 from the cutting edge 20 greatly facilitates the forming of the tortilla in that the pressing member, whether it be a roller or a flat panel, can press directly on the cutting edge without interference. Utilizing a roller, as suggested in FIG. 8, the roller can actually roll downward beyond the cutting edge and be guided thereto and therefrom.

With regard to the preferred manner of using the mold, attention is directed to FIGS. 6 through 9. Initially, the mold is adjusted for the particular thickness of tortilla desired. The mold is then placed on a table with the mold cavity 14 upwardly directed. A piece of plastic sheeting, approximately 7 inches by 14 inches and 1 mil in thickness, is laid over the mold and partially depressed into the cavity overlapping approximately one inch about three-quarters of the mold cavity. The remainder of the plastic sheet, designated in the drawings by reference numeral 48, extends outwardly on the support surface or table. Next, approximately one cup of cornmeal dough 50 is placed in the plastic covered cavity and the extended portion of the plastic is folded thereover. The plastic covered dough is then rolled or pressed, spreading so as to conform to the interior of the plastic lined cavity and bringing the lower layer of the plastic in close conformity to the cavity if it has not in fact been previously fitted exactly thereto. The pressing or rolling continues until the cavity is completely filled and the excess dough spread outwardly beyond the surrounding cutting edge 20 and, and between the plastic layers, severed. The upper layer of plastic is then lifted and the excess dough cut away, after which the formed tortilla is, by raising of the lower layer of the plastic 48, lifted from the cavity and peeled from the plastic for cooking. It will thus be appreciated that the tortillas are formed in a unique manner which insures an exactly formed product in a simple, efficient and rapid manner productive of a perfectly formed product each time.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A food mold for tortillas or the like comprising a frame, said frame having an enlarged support surface engaging base portion and a central upwardly opening molding cavity, said cavity including a smooth vertical wall terminating in an upper peripheral cutting edge defined by an outer frame wall meeting the cavity wall at an acute angle along the full length thereof, and a bottom in said cavity, said cavity bottom being vertically adjustable, adjusting means for vertically adjusting said bottom and locking said bottom in a vertically adjusted position, said adjusting means providing for an infinite adjustment of the bottom within a preselected range, and guide means for guiding said bottom during the vertical adjustment thereof, said guide means comprising a plurality of projections depending perpendicularly from said bottom, and a plurality of upwardly directed frame sockets slidably receiving said projections.

2. The mold of claim 1 wherein said adjusting means comprises a plurality of screws engaged upwardly through the frame base portion and into said bottom projections, said projections incorporating internally threaded bores for the reception of the screws.

* * * * *